Patented Aug. 22, 1950

2,520,038

UNITED STATES PATENT OFFICE 2,520,038

PROCESS FOR PREPARING PYRIDOXINE HYDROCHLORIDE

Martin Everett Hultquist, Bound Brook, and Richard Paul Germann, Plainfield, N. J., assignors to American Cyanamid Company, New York, N. Y., a corporation of Maine No Drawing. Application April 14, 1948, Serial No. 21,088

2 Claims. (Cl. 260—297.5)

This, our invention, relates to the preparation of impregnated porous materials suitable for the use in the hydrogenation of certain organic compounds, more particularly characterized in that a palladium salt is impregnated upon a charcoal carrier and reduced to an activated form of palladium on the porous support; and to the product itself; more particularly characterized by the fact that the reduction of the palladium salt to the activated form of palladium occurs at a temperature essentially lower than 0° C.

An object of our invention is the production of a palladium on charcoal type catalyst in which the activity is accentuated by the method of its preparation comprising the steps of the reduction of the palladium salt on the charcoal support occurring at a temperature substantially below that of the freezing point of water. Particularly advantageous results will below be shown to occur within the range of minus 20° C. to minus 50° C. and lower. The limitation of a minus 50° C. is not based so much upon the physical limitations of the invention as upon the physical limitations of conveniently obtainable plant conditions for this particular type of reduction. Lower temperatures down to the freezing point of solvents employed will be found markedly advantageous, but are more limited commercially by the difficulties involved in obtaining such temperatures in plant production of such catalysts. It will be found that the catalyst prepared in accordance with our invention maintains its activity and may be used after having been permitted to maintain higher temperatures and may be used at much higher temperatures.

For all intents and purposes it appears that our improved catalyst may be used for purposes substantially the same as prior art palladium on charcoal catalyst with marked improvement in yields being obtained. The catalyst may be used in both liquid and gaseous phase reduction and the temperature at which the catalyst is used may be in accordance with conventional practice.

It is a specific object of our invention to prepare a particular palladium on charcoal catalyst which is markedly effective for the reduction of 2-methyl-3-nitro-4,5-bis-cyano-6-halopyridine to 2-methyl-3-amino-4,5-bis-(aminomethyl)pyridine. A similar type of reduction has been described in the prior art but the specific catalyst herein described and claimed will be found to give superior yields under otherwise identical conditions. Additionally, frequently less catalyst is required, if our improved catalyst is used, and our catalyst may be reused.

The general use of palladium on charcoal catalyst is not new, being set forth in such places as Homer Adkins, Organic Syntheses, volume 26, John Wiley & Sons, New York, 1946, wherein a synthesis on page 32, describes the reduction of palladium on carbon catalyst in which commercial palladium chloride is added to "Norite" (activated carbon) and reduced in a solution of sodium acetate tri-hydrate and water by the addition of hydrogen. The same text on page 46 describes a preparation of a palladium catalyst under somewhat similar conditions. A more complete description of a product of a palladium catalyst is given in the same text at page 77, on a preparation by Ralph Mozingo. Therein are described certain preparations of palladium for use as catalysts. We have found that if the reduction of the palladium salt to palladium for use in the reduction, as set forth in these articles in Organic Syntheses, is carried out at a markedly reduced temperature the resultant catalyst obtained will be found to have a markedly improved catalytic effect but will be comparatively similar to the catalyst otherwise obtained, if the instructions as given in Organic Syntheses are faithfully followed.

Other methods of preparing palladium on charcoal catalyst are described in such patents as that of Orchin, No. 2,414,118, and elsewhere. Such catalysts have been previously used but in contrast thereto, our improved catalyst gives superior results because of the enhanced activity of the palladium formed by the reduction at comparatively low temperatures.

It is difficult if not impossible, to give a clear cut description of the exact differences of catalyst prepared in accordance with the instant invention by direct observation. The catalyst produced by the reduction at low temperatures appears on casual observation to be identical with that prepared at room temperature in accordance with conventional practice. Characteristics such as the unheated surface area, the heated surface area, and pore volume, will vary more with the source of activated carbon and variations in other treatment conditions than between the prior art material and our improved materials. However, it will be found invariably that the material reduced at the lower temperature will give markedly improved results over the same material reduced at room temperature or above. A particular instance of this is in the reduction of compounds involved in the reduction of certain of the synthetic vitamin B group as described more in detail below. Whereas in no way intending to limit the scope of our invention, certain specific applications will be described showing applications of the invention to the preparation of a palladium catalyst and in the application of the so formed catalyst to specific reductions. Whereas the improvement in reduction can be most easily distinguished by a direct comparison with the prior art catalyst, our new catalyst may be used in some circumstances where prior art catalysts gave negligible or no yields.

EXAMPLE 1

*Catalyst production at 25°–28° C.*

A catalyst is produced by dissolving 1 part of $PdCl_2.2H_2O$ in 9.6 parts of concentrated HCl, 100 parts methanol, 108 parts of water, adding thereto 4.5 parts of an activated charcoal, placing in a stirring autoclave and maintaining the mixture at 25°–28° C. The autoclave is flushed free of air by successive evacuations and additions of nitrogen. After a final evacuation the temperature is adjusted at 25°–28° C., hydrogen added and the palladium chloride reduced at 30 lbs. per square inch gauge. The reduction is continued as long as hydrogen is consumed. After hydrogen ceases to be absorbed, there is added 4.4 parts of 2-methyl-3-nitro - 4,5 - dicyano-6-chloropyridine dissolved in 48 parts of methanol. Reduction is continued at 30 lbs. per square inch gauge pressure until no further absorption of hydrogen takes place. The reaction temperature remains the same or slightly above room temperature during the reduction. The autoclave is flushed free of hydrogen by successive evacuations and additions of nitrogen. 75 parts of a hydrogen chloride saturated-ethanol solution is added and the mixture cooled with stirring to 10° C. The mixture is filtered and washed with 50 parts of ethanol and sucked dry. The filter cake is slurried in 25 parts of water and filtered. An aliquot portion of this solution which is evaporated to dryness, produces a yield of 2-methyl-3-amino-4,5-bis (amino methyl)-pyridine trihydrochloride equivalent to a yield of 39% of theory for the whole batch.

The remaining portion of the reduction solution is converted directly to pyridoxine by the customary decomposition procedure with nitrous acid to give an overall yield of 17% of pyridoxine hydrochloride from the 2-methyl-3-nitro-4,5-dicyano-6-chloro pyridine.

Similar experiments were carried out with all the variables, other than the reduction temperatures, essentially the same as those of Example 1, and the following results were obtained:

|  | Temp. of Catalyst Reduction | Yield of 2-methyl-3-amino 4,5-bis (amino methyl) Pyridine trihydrochloride | Yield of Pyridoxine Hydrochloride |
| --- | --- | --- | --- |
|  | °C. | Per cent | Per cent |
| Example 2 | 50 | 0 | 0 |
| Example 1 | +20+25 | 39 | 17 |
| Example 3 | −15−20 | 67.4 | 29.3 |
| Example 4 | −40−50 | 84 | 36.6 |

Whereas in the example the solvent was mainly methanol, ethanol or other alcohols may be used, and lesser or larger amounts of water. It is necessary that the reduction be carried out at a temperature such that the alcohol, water, acid mixture remains liquid. As long as the mixture is liquid, the lower the temperatures, the more desirable the result appears to be.

The exact qualities of the catalyst depend upon a large number of factors including particularly the type of charcoal, or other support, its degree of division, its age, time elapsed between the preparation of the catalyst, and its history, impurities present, purity of the hydrogen, solvents, concentrations, and many other factors. It is not possible with any degree of certainty to state that a particular catalyst prepared in a particular manner will give a particular yield unless the complete history of the charcoal is known and unless far more variables are controlled than is normally done in laboratory procedures. However, other things being equal, it will be invariably found that the use of the lower temperatures in the reduction will give an improved catalyst.

The catalyst may be used after filtering and washing off the mixture in which it is prepared, using it as a wet slurry, or the catalyst may be washed with water, dried at not higher than approximately room temperature and stored for some time. Reagents in the air in the ordinary laboratory or industrial plant as well as the oxygen in the air will gradually reduce the activity of the catalyst so that a tightly stoppered bottle is desirable and the catalyst should be used reasonably fresh. Such keeping qualities, methods of treatment, etc., are comparable and analogous to that to be expected as exemplified by the prior art disclosures on similar types of palladium catalyst which were reduced at room temperature.

It has not been found that surface area, pore volume, etc., are completely indicative of the reactivity to be expected from this catalyst. There is some degree of correlation but it is not invariable. As a specific example, 10% palladium reduced on the type of activated charcoal sold commercially as "Norite L1" when reduced in accordance with the method of the example at a temperature of 30°–35° C. was degassed at room temperature. In accordance with standard procedures nitrogen was absorbed thereon at the temperature of liquid nitrogen and the surface area calculated on the basis of the cross section area of the nitrogen molecule being 16.2 sq. Angstrom units. As so treated the catalyst showed an area of 780 sq. meters per gram. A sample test using argon on a sample degassed at 300±10° C. gave an area of 968 sq. meters per gram. A calculation of pore volume gave 0.445 cc. per gram. A sample of the same palladium on the same "Norite L1" activated charcoal reduced at a temperature between −45° to −30° C. gave unheated surface area of 830 sq. meters per gram; a heated surface area of 1380 sq. meters per gram, and a pore volume of 0.610 cc. per gram.

Other types of activated charcoal, while of comparable activity for reduction purposes gave entirely different values on the above test. On one particular sample of "Darco" brand of activated charcoal there was practically no difference in unheated surface area, heated surface area and pore volume between the catalyst prepared by reduction at low temperatures and that reduced at room temperatures.

It will accordingly be seen that the history of the activated charcoal is extremely important and that it is not reasonably possible to distinguish between applicants' improved catalyst and the prior art catalyst by tests other than its efficacy for the designed purposes.

It will be found that applicants' improved palladium charcoal catalyst will give satisfactory reductions in all instances where palladium charcoal catalysts have previously been used and will additionally give improved yields as a result of the low temperature used in the reduction of the palladium.

Having therefore set forth in detail the method of preparation and the advantages of our new and improved catalyst, as our invention, we claim:

1. A process of preparing pyridoxine hydrochloride which comprises impregnating an activated charcoal with a reducible palladium salt and reducing the salt in the presence of alcohol, water and acid by treatment with hydrogen at a temperature essentially less than 15° C., treating 2-methyl-3-nitro-4,5-dicyano-6-chloropyridine therewith while adding additional hydrogen, removing the charcoal catalyst from the reduced product, treating the thus formed 2-methyl-3-amino-4,5 bis-(amino-methyl)pyridine tri-acid with nitrous acid and isolating the thus formed pyridoxine as its hydrochloride.

2. A process of preparing pyridoxine hydrochloride which comprises dissolving a reducible palladium salt in a mixture of an acid and alcohol and water, adding thereto an activated charcoal, adding thereto hydrogen gas in the absence of air at a temperature essentially below 15° C., adding thereto 2-methyl-3-nitro-4,5-dicyano-6-chloropyridine, adding thereto additional hydrogen until substantially no more hydrogen is absorbable, removing the charcoal from the reaction product, adding nitrous acid thereto and isolating the thus formed pyridoxine hydrochloride.

MARTIN EVERETT HULTQUIST.
RICHARD PAUL GERMANN.

REFERENCES CITED

The following references are of record in the file of this patent:

UNITED STATES PATENTS

| Number | Name | Date |
|---|---|---|
| 1,547,236 | Reyerson | July 28, 1925 |
| 1,925,820 | Reyerson | Sept. 5, 1933 |
| 2,139,529 | Streicher | Dec. 6, 1938 |
| 2,266,754 | Harris | Dec. 23, 1941 |
| 2,310,167 | Carlson | Feb. 2, 1943 |
| 2,410,531 | Szabo | Nov. 5, 1946 |

FOREIGN PATENTS

| Number | Country | Date |
|---|---|---|
| 265,938 | Great Britain | Apr. 18, 1928 |

OTHER REFERENCES

Organic Synthesis, Adkins, vol. 26, John Wiley & Sons, 1946, p. 46.

Certificate of Correction

Patent No. 2,520,038 August 22, 1950

MARTIN EVERETT HULTQUIST ET AL.

It is hereby certified that error appears in the printed specification of the above numbered patent requiring correction as follows:

Column 5, lines 14 and 27, for "15° C." read —*15° C.*;

and that the said Letters Patent should be read as corrected above, so that the same may conform to the record of the case in the Patent Office.

Signed and sealed this 7th day of November, A. D. 1950.

[SEAL]

THOMAS F. MURPHY,
*Assistant Commissioner of Patents.*